United States Patent Office 3,320,025
Patented May 16, 1967

3,320,025
PROCESS FOR THE PREPARATION OF A TITANATE CONTAINING TWO ALKALI METALS
Foord Von Bichowsky, 1620 Harvey Road, Wilmington, Del. 19803
No Drawing. Filed Sept. 11, 1963, Ser. No. 308,078
4 Claims. (Cl. 23—51)

This invention relates to a process for the preparation of a titanate containing two alkali metals and more particularly to the hexatitanate of the alkali metals sodium and potassium in which these metals are present in equimolecular proportions.

It is known, for example, from the disclosures in the U.S. Patent No. 1,731,364 of Oct. 15, 1929, and in U.S. Patent No. 2,841,470 of July 1, 1958, that the simple hexatitanate of sodium and the simple hexatitanate of potassium are characterized in that their crystals are needle-like in shape and somewhat flexible. In contrast the new sodium potassium hexatitanate as described herein occurs in the form of quadrangular prisms with flattened ends. These prisms have a thickness of about one fifth of their length and show a definite pattern on X-ray analysis. They generally are found in parallel clusters, are brittle and because of their friability break, on grinding, into irregular cubic particles of about 0.1 to 1.0 micron in size. The resulting white powder is useful for pigmenting purposes and for other applications.

In the manufacture of the known simple hexatitanates one usually sinters pure titanium dioxide with the stoichiometric amount of the desired alkali metal carbonate or nitrate with or without varying amounts of a flux. The process of the present invention differs therefrom in that one may employ the double alkali metal salt of a dibasic acid, containing carbon, such, for example, as that of carbonic acid, the NaKCO₃ or the sodium potassium salt of a dicarboxyl aliphatic acid, e.g. the tartrate

NaKC₄H₄O₆·4H₂O or even the sodium potassium salt of an aromatic acid, for example, that of phthalic acid NaKC₈H₄O₄. A flux is not required when any of these compounds is used but the reaction temperature should be kept moderately low to avoid any volatilizing of the alkali content.

The application of the members of the above group of salts to the present process will be illustrated by the following non-restrictive examples in which the proportions of the reactants are by weight.

Example 1.—4.8 parts of reagent grade titanium dioxide are mixed with 2.82 parts of pure Rochelle salt (potassium sodium tartrate) and after blending it is placed, for example, in a platinum dish and gently heated until the organic salt has melted. The temperature of the molten salt is raised until the organic compound is decomposed. Thereafter the dish and contents are heated, for example, in a muffle furnace to a temperature of about 950–1000° C. and held there for an hour. The resulting white cake either is dry ground (micronized) or wet ground, to remove any soluble impurities, until the ground particles are of pigment size.

Example 2.—5.2 parts of a slightly calcined filter cake, as obtained in the manufacture of a titanium dioxide by hydrolysis and which was found to contain 92% of TiO₂ are mixed intimately with 2.27 parts of the sodium potassium salt of dicarbonic acid (phthalic) acid. Here, as in Example 1, the salt first fuses, then gradually decomposes and under continued heating finally may ignite within the mix with a dull glow. This glowing can supply part of the heat needed for the calcination which is continued for an hour at around 950° C. The resulting cake, likewise white in color, may be treated as by the procedure of Example 1.

Example 3.—The source of the TiO₂ used here is a finely ground Australian rutile containing approximately 97% of titanium dioxide associated with vanadium, chromium and iron compounds. The double alkali metal salt used is the apparently non-hygroscopic sodium potassium carbonate prepared, e.g. in accord with the method of German Patent No. 354,575 of A. Welter. The operations are as follows:

4.9 parts of the rutile (200 mesh or finer) are mixed intimately with 1.22 parts of the NaKCO₃, dampened for good contact, dried and calcined in a slow current of air for one hour at 900–1100° C. When cold the cake is crushed, moistened, for example with a little dilute nitric acid, i.e. 1 part of 25% acid, for the purpose of assuring completion of the oxidation of the Cr and V in the product. The damp cake is dried and recalcined for an hour at circa 800° C. If the resulting calcine is completely uniform in color it is ready for grinding. If not the second calcination is repeated. When cold the cake is dry ground and leached with, for example, a 5% solution of sulfuric acid or else the crushed cake is wet ground with such an acid to a uniform size. The weak acid in the slurry is removed by filtration or sedimentation or both and may be worked up for the chromates and vanadates which it contains. The filter cake appears white but on drying it does not always keep a whiteness suitable for the more exacting uses. The off-color appears to be due to the presence of iron oxide. For some purposes this crude cheap material is satisfactory, e.g. for use as a lubricant in the hot rolling or drawing of metals, as a dusting powder, extender or for other uses.

If a whiter product is required the intercalated iron content may be removed readily since the powder is very fine, for example, by heating the sodium potassium hexatitanate to below its reduction temperature, e.g. to 300–500° C. in an atmosphere containing sulfur, for example, in hydrogen sulfide and when cold removing the ferrous sulfide or other sulfur compound by an acid leach. The pigment after the removal of the iron appears competitive with other known materials for use in cements, etc.

The suggested applications of this new product are only for the purpose of illustration and are not limitative since what is specific to the invention is embodied and defined in the following claims:

I claim:
1. A process for the preparation of sodium potassium hexatitanate in the form of quadrangular prisms comprising heating at a temperature within the range of 900–1100° C. a dry mixture containing stoichiometric amounts of TiO₂ and a sodium potassium salt selected from the group consisting of sodium potasium carbonate, sodium potassium tartrate and sodium potassium phthalate until the reaction is completed, recovering as product sodium potassium hexatitanate in the form of quadrangular prisms and grinding said product whereby irregular cubic particles are produced.

2. A process for the preparation of sodium potassium hexatitanate in the form of quadrangular prisms comprising heating at a temperature within the range of 900–1100° C. a dry mixture containing stoichiometric amounts of titanium dioxide and of sodium potassium tartrate until the reaction is completed, recovering as product sodium potassium hexatitanate in the form of quadrangular prisms and grinding said product whereby irregular cubic particles are produced.

3. A process for the preparation of sodium potassium hexatitanate in the form of quadrangular prisms comprising heating at a temperature within the range of 900–1100° C. a dry mixture containing stoichiometric amounts of TiO₂ and of sodium potassium phthalate until the reaction is completed, recovering as product sodium potassium hexatitanate in the form of quadrangular prisms and grinding said product whereby irregular cubic particles are produced.

4. A process for the preparation of sodium potassium hexatitanate in the form of quadrangular prisms comprising heating at a temperature within the range of 900–1100° C. a dry mixture containing stoichiometric amounts of a naturally occurring titanium dioxide and sodium potassium carbonate, $NaKCO_3$, until the reaction is completed; then grinding said product in an aqueous leach containing not above 5% by weight of sulfuric acid, removing the resulting wet product, separating it from the leach liquor and purifying said hexatitanate by heating it to not in excess of 500° C. in a current of hydrogen sulfide; leaching out the formed iron sulfide with the above leaching solution, washing and drying the thus purified irregular cubic particles produced.

References Cited by the Examiner
UNITED STATES PATENTS

| | | | |
|---|---|---|---|
| 1,731,364 | 12/1929 | Bichowsky | 23—51 |
| 1,929,521 | 10/1933 | Ryan et al. | |
| 2,758,911 | 8/1956 | Lynd et al. | 23—51 |
| 2,841,470 | 7/1958 | Berry | 23—51 |
| 3,129,105 | 4/1964 | Berry et al. | 23—51 X |

OSCAR R. VERTIZ, *Primary Examiner.*

H. T. CARTER, *Assistant Examiner.*